United States Patent

Shtipelman

[11] Patent Number: 5,428,589
[45] Date of Patent: Jun. 27, 1995

[54] APPARATUS AND METHOD FOR AN ELECTROMAGNETIC ACTUATOR WITH TWO ORTHOGONAL AXES OF MOTION

[75] Inventor: Boris A. Shtipelman, Rochester, N.Y.

[73] Assignee: Eastman Kodak Company, Rochester, N.Y.

[21] Appl. No.: 108,031

[22] Filed: Aug. 17, 1993

[51] Int. Cl.⁶ .............................................. G11B 7/12
[52] U.S. Cl. ........................ 369/44.15; 369/44.16; 369/44.14; 359/813; 359/824
[58] Field of Search ............... 369/44.14, 44.15, 44.16, 369/44.17, 44.11, 44.28, 44.41, 44.22; 359/813, 814, 823, 824

[56] References Cited

U.S. PATENT DOCUMENTS

| | | | |
|---|---|---|---|
| 4,449,213 | 5/1984 | Noborimoto et al. | 369/45 |
| 4,475,179 | 10/1984 | Geyer | 365/215 |
| 4,553,227 | 11/1985 | Kido et al. | 369/44 |
| 4,646,283 | 2/1987 | Ito et al. | 369/256 |
| 4,766,583 | 8/1988 | Oinoue et al. | 369/45 |
| 4,782,475 | 11/1988 | Chandler | 369/45 |
| 4,794,581 | 12/1988 | Andresen | 369/45 |
| 4,813,033 | 3/1989 | Baasch et al. | 369/45 |
| 4,878,214 | 10/1989 | Hinotani | 369/256 |
| 4,927,235 | 5/1990 | Narumi | 350/252 |
| 5,018,836 | 5/1991 | Noda et al. | 350/247 |
| 5,068,844 | 11/1991 | Tanaka | 369/44.16 |
| 5,073,883 | 12/1991 | Mitsumori | 369/44.15 |
| 5,128,806 | 7/1992 | Ohno | 359/813 |
| 5,130,854 | 7/1992 | Suzuki | 359/823 |
| 5,136,558 | 8/1992 | Getreuer et al. | 369/44.15 |
| 5,161,067 | 11/1992 | Tomiyama et al. | 359/824 |
| 5,199,014 | 3/1993 | Homburg et al. | 369/44.15 |
| 5,208,703 | 5/1993 | Ikegame et al. | 359/813 |

FOREIGN PATENT DOCUMENTS 0510652 10/1992 European Pat. Off. ......... 369/44.15

Primary Examiner—Georgia Y. Epps
Assistant Examiner—Muhammad N. Edun
Attorney, Agent, or Firm—Peter J. Bilinski

[57] ABSTRACT

An actuator of the type used in interacting with optical storage media includes a lens housing coupled to a stationary member by four X cross-section flexure arms. The lens housing has coupled thereto a coil assembly which, when current flows through at least one of the component coils of the coil assembly, interacts with a magnetic structure resulting in motion of the lens housing relative to the stationary member. The lens housing, the stationary member, and the flexure arms are fabricated from two identical members. The members have structure fabricated therein which permits the accurate positioning of the identical members during assembly. The flexure members have generally orthogonal thin regions which determines the motion of the lens housing relative to the stationary member. The coil assembly includes rectangular coils which are easily fabricated and conveniently assembled.

16 Claims, 2 Drawing Sheets

APPARATUS AND METHOD FOR AN ELECTROMAGNETIC ACTUATOR WITH TWO ORTHOGONAL AXES OF MOTION

FIELD OF THE INVENTION

The present invention is related to the field of data storage and retrieval and, more particularly, to an apparatus, generally referred to as an actuator, for both focusing a laser beam on a storage surface of an optical data storage medium and for controlling the radial position on a signal track. The signal track is defined by optically identifiable regions which can be written on the storage surface and/or which can be read through the interaction of a laser beam with the storage surface.

BACKGROUND OF THE INVENTION

A multiplicity of actuators have been described in the prior art in the read/write heads of optical storage recorder/player units which control both the focusing and the tracking of the laser beam on optically distinct regions. Typically, the objective lens of the actuator is moved by linear moving coil motors and is suspended in such a fashion that the lens can be displaced along two orthogonal axes. One of the orthogonal axes is the vertical axis (i.e., an axis perpendicular to the storage surface) which is used for focusing. The second orthogonal axis is horizontal and is used for positioning the laser beam relative to signal tracks on the storage surface. By way of specific implementation of the suspension of the objective lens in an optical read/write system, the actuator described in the U.S. Pat. No. 5,199,014 incorporates two injection molded plastic structures attached at opposite sides of the lens housing. Other suspension systems found in the related art use wires, i.e., U.S. Pat. No. 4,782,475, rubber structures, or metal blades, i.e., U.S. Pat. No. 5,136,558, etc. In all the foregoing implementations, suspension design requires dynamic performance without resonances in the desired range of operating frequencies (excluding the first natural frequency). The motors of the actuator must provide a predetermined amount of driving force to accelerate the lens and the associated housing. The actuator package should be easily assembled and should be compact enough to fit in the limited volume available in the contemporary optical disc drive mechanisms. The actuator should be capable of being fabricated at low cost despite the fact that most actuators described in the related art are complicated and consist of many different parts requiring a high degree of accuracy combined with an elaborate and time consuming assembly.

A need has been felt for a two-axis actuator characterized by a high degree of simplicity, a low number of parts, relaxed requirements with respect to accuracy, and, as a result, a low cost in manufacturing and assembly of the actuator.

SUMMARY OF THE INVENTION

The present invention is directed to overcoming one or more of the problems set forth above. Briefly summarized, according to one aspect of the present invention, an actuator includes a stationary member, a lens housing, and four flexure bars coupling the stationary member and the lens housing. The flexure bars are fabricated so that when the lens housing moves relative to the stationary member, the orientation of the lens housing remains fixed. A coil assembly is coupled in the lens housing and, when current is applied to one of the plurality of coils of the coil assembly, the interaction of the current with a magnetic field originating from a magnetic structure causes the lens assembly to move relative to the stationary member. The movement of the lens assembly provides the focusing and the tracking of a radiation field on the optical storage medium. The stationary member, the lens assembly, and the flexure bars are comprised of two identical top and bottom sections, the two sections including structure to determine the relative positions of the top and bottom sections when they are assembled. The top and bottom sections include structure to engage the coil assembly securely, the forces acting on the coil assembly determining the position of the lens housing relative to the stationary member.

The use of the single injection molded structure to provide both the top and bottom of the stationary member and the lens housing and to provide the flexure arms reduces the number of elements and assembly. In addition, the molded structure includes projections and apertures which position the two portions during assembly. The coil assembly is rectangular in form and lends itself to easy fabrication. The X cross-section flexure arms, as part of the molded structure, are capable of bending only at the thinned portions and provide the constant spatial orientation when being repositioned. Thus both the number of parts has been reduced and the complexity of and the time for assembly of the actuator is reduced.

These and other aspects, objects, features and advantages of the present invention will be more clearly understood and appreciated from a review of the following detailed description of the preferred embodiments and appended claims, and reference to the accompanying drawings.

DETAILED DESCRIPTION OF THE INVENTION

Figure 1:
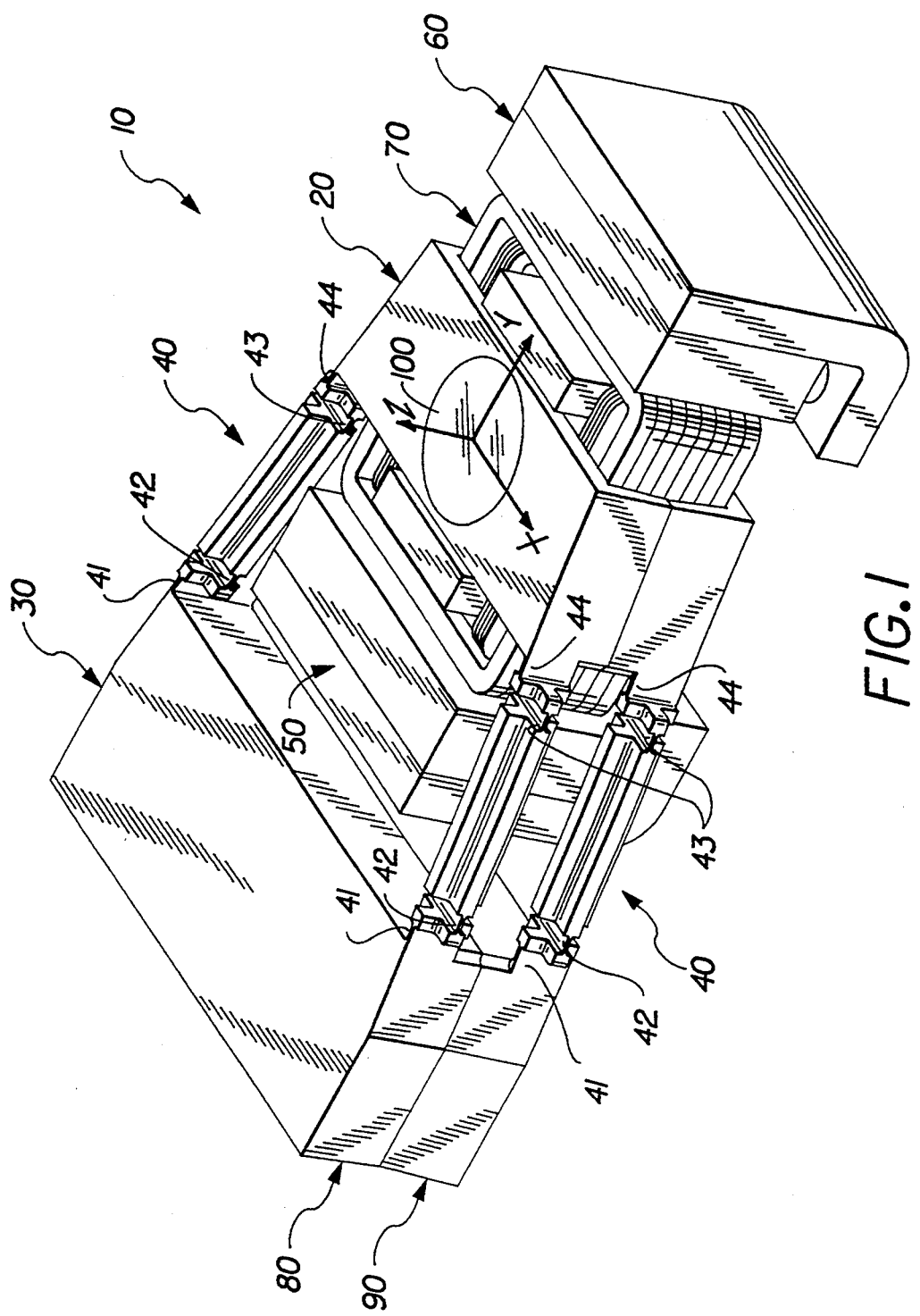
FIG. 1 is a perspective view of an actuator for an optical storage and retrieval system according to the present invention.

Referring now to FIG. 1, an actuator 10 for an optical storage and retrieval system includes an objective lens 100 mounted in a lens housing 20. The lens housing 20 is coupled to a stationary member 30 by means of four flexure bars 40. Near each end of the flexure bars 40 are thin sections 41,42 and 43,44 oriented in the horizontal and vertical directions, respectively. When a force is applied to the lens housing, these thin sections 41,42 and 43,44 allow the lens housing to be displaced in the vertical and horizontal direction for the focusing and the tracking operations of the actuator 40 relative to the stationary portion 30. A top portion of lens housing 20 and a top portion of stationary member 30 coupled by a first pair of the flexure arms 40 comprises a top section 80 of the actuator, while a bottom portion of the lens housing 20 and a bottom portion of stationary member 30 coupled by a second pair of flexure arms comprises a bottom section 90 of the actuator 10. Both halves of the actuator are identical and fabricated as injection-molded plastic parts. The assembly includes gluing the bottom section 90 and the top section 80 together. The motion of the lens housing 20 in either the vertical or horizontal direction is a result of forces applied along the Z and/or the X axis, cf. FIG. 1. The forces exerted on the lens housing 20 are created by two linear moving coil motors. Each motor is comprised of magnetic structure 50 and magnetic structure 60 combined with the moving coil assembly 70. The coil assembly 70 is located in the lens housing 20.

Figure 2:
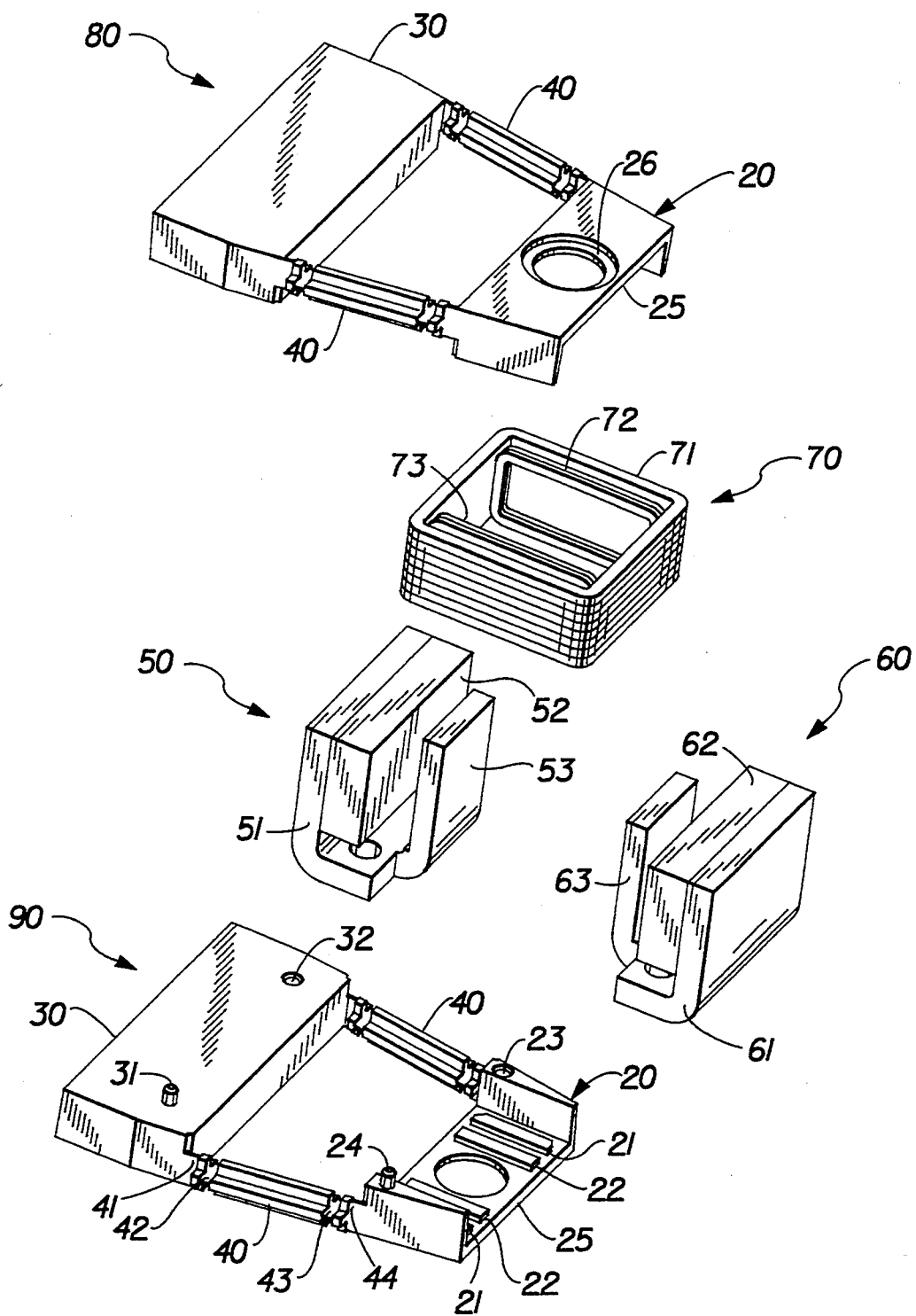
FIG. 2 is an exploded view of an optical storage and retrieval unit actuator according to the present invention.

Referring next to FIG. 2, a more detailed understanding of the operation of the invention can be determined from the exploded view of actuator 20. As discussed previously, the top section 80 and the bottom section 90 of the actuator 10 are identical and include portions of the lens housing 20 and the stationary member 30 along with two flexure bars 40. The lens housing, as seen in the bottom portion 90, incorporates a housing frame 25. The housing frame 25 includes two pairs of locating features. A first pair of locating features is the focusing elements 21 to align the focusing coil 71. The second pair of alignment elements are the tracking elements 22 to align the tracking coils 72 and 73. A hollow seating surface 26 in the housing frame 25 (shown in the top section 80) is used to position objective lens 100. The two portions of the lens housing 25 are fitted with a hole 23 and a pin 24. Similarly, the two portions of the stationary member have a pin 31 and a hole 32. The holes 23 and 32 and the pins 24 and 31 align the top section 80 with the bottom section 90 during assembly of the actuator 10.

Supporting bars 40 are constructed with an X cross-section that provides rigidity and stiffness of the actuator suspension. To allow the bars to bend in either the vertical or the horizontal direction, two pairs of thin sections 41 and 42 and thin sections 43 and 44 are provided at each end of the bar 40. The thin sections 41 and 44 are oriented vertically and permit motion of the head assembly 20 in the horizontal direction relative to stationary member 30. Thin sections 42 and 43 are oriented horizontally and permit motion of the lens housing in the vertical direction relative to the stationary member 30.

Moving coil assembly 70 includes three separate coils having a generally rectangular shape. Focus coil 71 is wound around the vertical (Z) axis in the horizontal plane (i.e., the X-Y plane in FIG. 1). Two tracking coils 72 and 73 are wound around the horizontal (X) axis and are coupled (glued) to the inside of focus coil 71. Tracking coils 72 and 73 are positioned in such a way that the narrow 53 and 63 portions of the U-shaped steel brackets 51 and 61 can be located therebetween. The brackets 51 and 61 belong to each magnetic structure (linear motor) 50 and magnetic structure (linear motor) 60. The magnetic field is created by permanent magnets 52 and 62. The focusing and tracking coils are located in this field. When electric current is applied to each of the coils, a resulting force will be applied to the lens housing 20 because the coil assembly 70 is coupled thereto. The resulting forces are directed along the Z axis or along the X axis and provide for the focusing or the tracking motion of lens 100.

It will now be appreciated that there has been presented an actuator which requires a fewer number of parts than the actuators described in the related art. The two identical molded structures which include sections of the lens housing and the stationary member coupled by two flexure arms comprise the major components of the actuator. Similarly, the coil assembly which provides the force to move the lens housing relative to the stationary member, is comprised of a rectangular coil with two smaller rectangular coils coupled thereto and is consequently easy to fabricate and easy to position in the lens housing. The two identical molded structures each have at least one aperture and one projection which position the two identical structures when assembled. Once again, the physical configuration of the identical molded structures results in simplified fabrication.

Operation of the present invention is believed to be apparent from the foregoing description and drawings, but a few words will be added for emphasis. The flexure arms 40, which couple the lens housing and the stationary member, have orthogonal thin sections which permit the lens housing to move in two orthogonal directions to permit the focusing and the tracking movements. The flexure arms are part of the identical molded structures so that the degrees of freedom of movement are determined simply by assembling the two molded structures.

While the invention has been described with reference to actuators for interaction with optical storage media, it is apparent that the invention is easily adapted to other devices that have parts that require two degrees of freedom of movement while maintaining the spatial orientation of the moving part. While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

PARTS LIST

10 Optical storage and retrieval actuator
20 Lens housing
21 Focusing elements
22 Tracking elements
23 Lens housing portion hole
24 Lens housing portion pin
25 Housing frame
26 Hollow seating surface
30 Stationary member
31 Stationary member pin
32 Stationary member hole
40 Flexure bars
41, 42, 43, and 44 Thin sections
50 Magnetic structure
51 Bracket
52 Permanent magnet
53 Leg
60 Magnetic structure
61 Bracket
62 Permanent magnet
63 Leg
70 Coil assembly
71 Focusing coil
72 Tracking coil 73 Tracking coil
80 Top section
90 Bottom section
100 Objective lens

What is claimed is:

1. An actuator comprising:
    a lens housing;
    a stationary member;
    four flexure arms coupling said lens housing and said stationary member for determining a relative motion of said lens housing relative to said stationary member, said flexure arms each being defined by a pair of orthogonally arranged thin portions at each end of each said flexure arm, each of said thin portions being thinner than a structural main portion, and having an orientation for determining said relative motion of said lens housing to said stationary member;
    wherein said lens housing, said stationary member and said four flexure arms are fabricated from two identical structure.

2. The actuator of claim 1 wherein said two identical structures are molded plastic.

3. The actuator of claim 2 wherein a first of said two identical structures provides a top portion of said lens housing and said stationary member; and wherein a second of said two identical structures provides a bottom portion of said lens housing and a bottom portion of said stationary member.

4. The actuator of claim 1 further comprising a coil structure connected to said lens housing, said coil structure including a plurality of coils, wherein current flowing through at least a selected one of said coils in the presence of a magnetic field results in motion of said lens housing in a selected direction relative to said stationary member.

5. The actuator of claim 4 wherein said coil structure includes a plurality of rectangular coils.

6. The actuator of claim 5 wherein a first rectangular coil is positioned with an axis generally along a focusing direction.

7. The actuator of claim 6 further comprising a second and a third rectangular coil having an axis perpendicular to said first rectangular coil, wherein current applied to said second and said third rectangular coils results in an interaction with said magnetic field causing movement along a tracking direction.

8. An actuator comprising:
    a first and a second identical member, wherein said first member includes a first portion of an actuator lens housing and a first portion of an actuator stationary member when assembled, wherein said second member includes a second portion of said actuator lens housing and a second portion of said stationary member when assembled, each identical member having two flexure arms coupling said lens housing portion and said stationary member portion, said flexure arms each comprising a pair of orthogonally arranged thin portions at each end of said each flexure arm, each of said thin portions being thinner than a structural main portion, for determining two orthogonal movement modes.

9. The actuator of claim 8 wherein said first and said second identical members are fabricated from molded plastic.

10. The actuator of claim 8 wherein each said identical member has structure for position said identical members during assembly.

11. The actuator of claim 10 further comprising a coil assembly connected to said lens housing, wherein current applied to said coil assembly results in a force on said lens housing resulting in relative motion between said lens housing and said stationary member.

12. The actuator of claim 11 wherein said coil assembly includes a plurality of generally rectangular coils.

13. The actuator of claim 12 wherein said four flexure arms result in said lens housing retaining an initial spatial orientation relative to said stationary member when said lens housing is moved relative to said stationary member.

14. An actuator comprising:
    a stationary member;
    a magnetic structure having a fixed spatial relationship to said stationary member;
    a lens housing;
    a coil assembly coupled to said lens housing, wherein a current applied to said coil assembly provides a force on said lens housing resulting from an interaction with said magnetic field; and
    four flexure arms connecting said lens housing and said stationary member, said four flexure arms each having a pair of orthogonally arranged thin regions at the end of each flexure arm, each of said thin regions being thinner than a structural main region of said arm, for determining a tracking movement and a focusing movement relative for said lens housing;
    wherein a first portion of said lens housing along with a first portion of said stationary member and two flexure arms are implemented by a single member, and wherein a second portion of said lens housing along with a first portion of said stationary member and two flexure arms are implemented using an identical single structure.

15. The actuator of claim 14 wherein said identical structures include physical features which position said identical structure during assembly.

16. The actuator of claim 14 wherein said identical structures are molded in plastic.

* * * * *